Nov. 22, 1960 — G. L. PIKE — 2,960,808

MACHINE AND METHOD FOR PACKAGING FOOD PRODUCTS

Filed Sept. 11, 1956 — 3 Sheets-Sheet 1

INVENTOR.
GERALD L. PIKE
BY Woodling & Kroet
Attys.

Nov. 22, 1960     G. L. PIKE     2,960,808
MACHINE AND METHOD FOR PACKAGING FOOD PRODUCTS
Filed Sept. 11, 1956     3 Sheets-Sheet 2
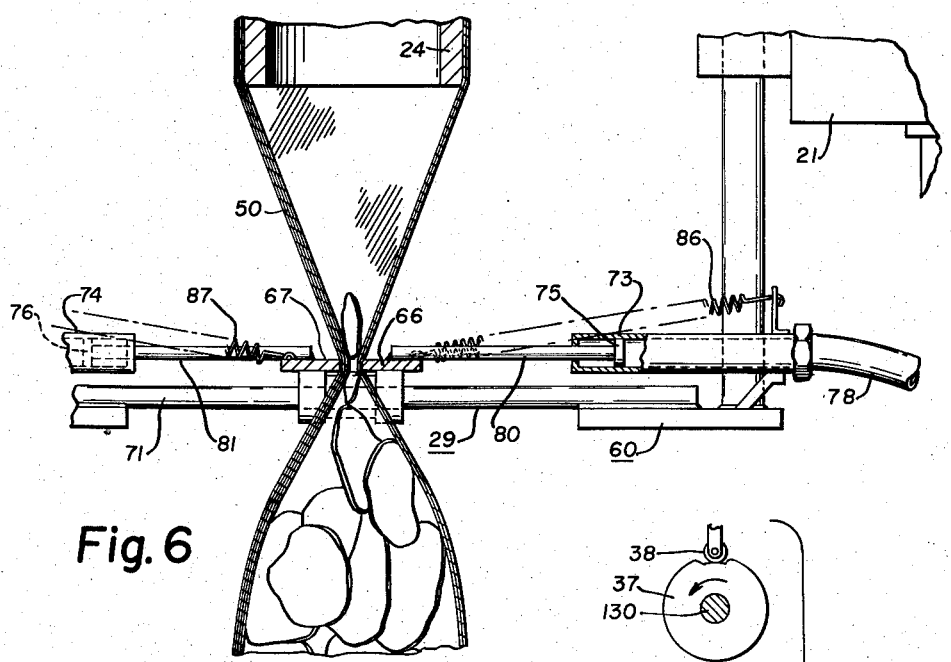
Fig. 6
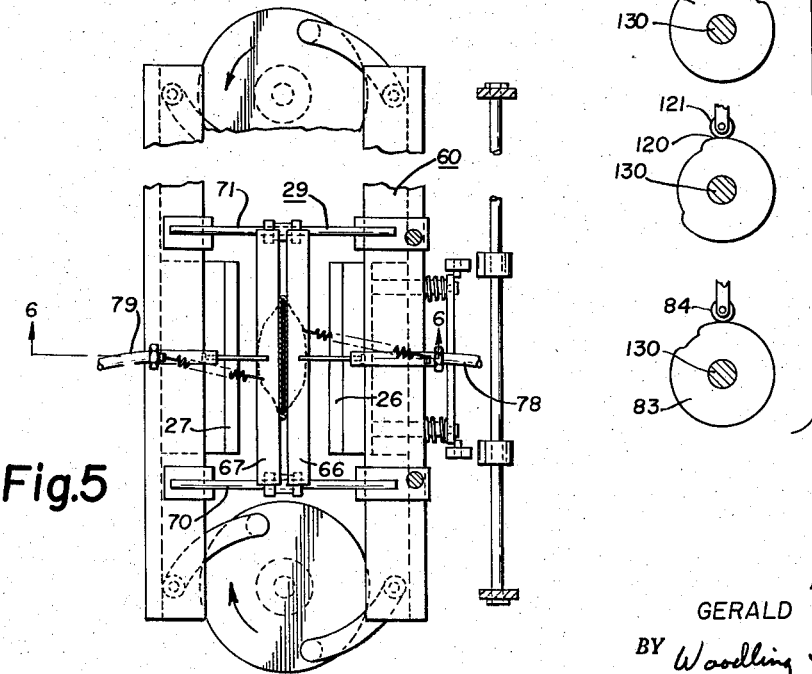
Fig. 5
Fig. 11
INVENTOR.
GERALD L. PIKE
BY Woodling & Krost
Atty's.

Nov. 22, 1960 G. L. PIKE 2,960,808
MACHINE AND METHOD FOR PACKAGING FOOD PRODUCTS
Filed Sept. 11, 1956 3 Sheets-Sheet 3
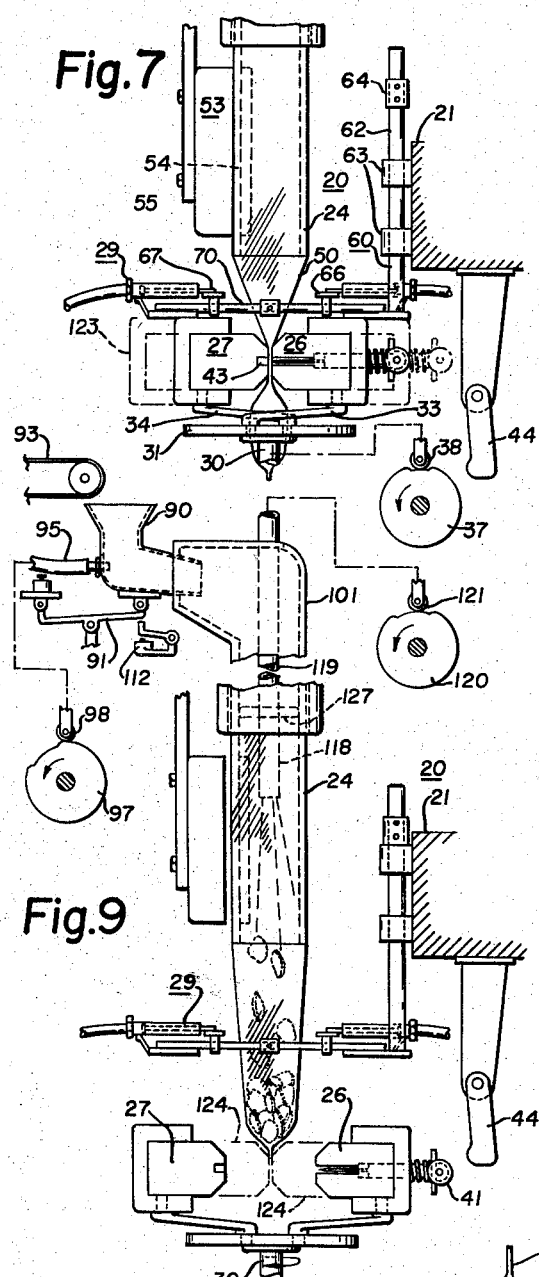
Fig.7
Fig.9
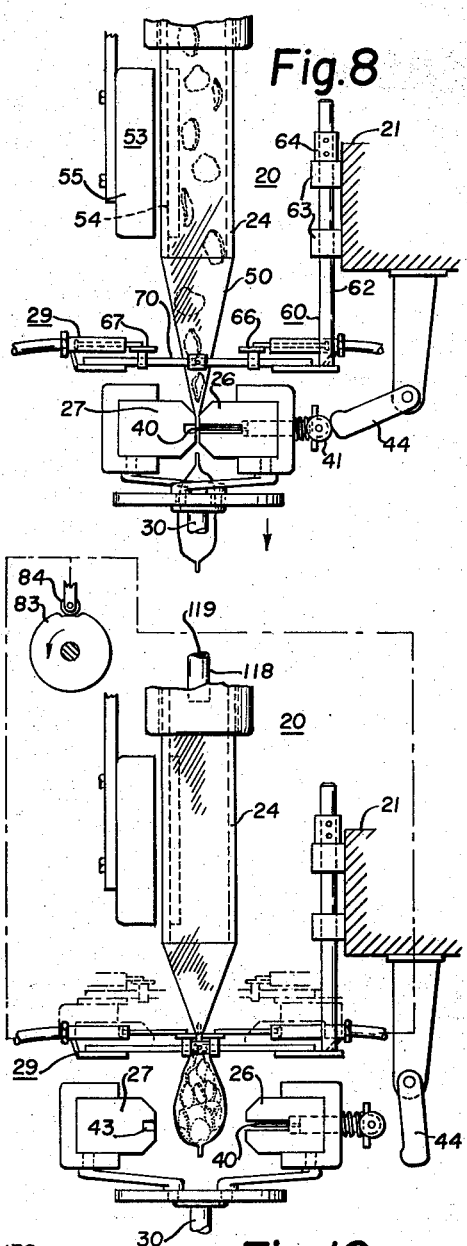
Fig.8
Fig.10
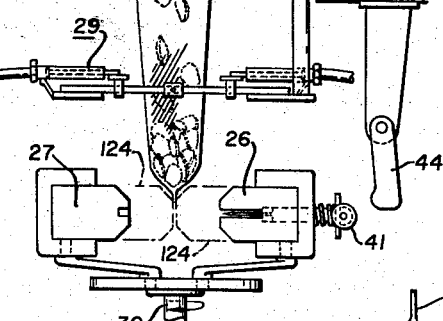
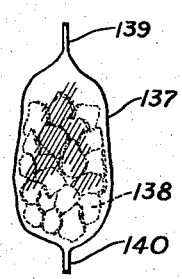
Fig.12
INVENTOR.
GERALD L. PIKE
BY Woodling & Krost
Attys.

United States Patent Office 2,960,808
Patented Nov. 22, 1960

2,960,808

MACHINE AND METHOD FOR PACKAGING FOOD PRODUCTS

Gerald L. Pike, 5016 Edgepark Drive, Cleveland 25, Ohio, assignor to Gerald L. Pike and Harry A. Orr, as co-trustees Filed Sept. 11, 1956, Ser. No. 609,282

17 Claims. (Cl. 53—24)

The invention relates in general to automatic packaging machines and methods and more particularly to machine and methods of continuously packaging food products such as potato chips and the like which packages are provided with excellent hermetic seals.

An object of the invention is to provide a machine for packaging food products which produces a perfectly sealed package.

Another object of the invention is to provide a method of packaging food products whereby a perfectly sealed package results.

Another object of the invention is to provide a machine for packaging food products in a bag which hash means for breaking up food products which chance to be in the bag where the bag is subsequently to be sealed thus permitting the broken food products to fall away from the place to be sealed.

Another object of the invention is to provide a method of packaging food products in a bag which includes the breaking of the food products which are located at the place where the bag is to be sealed thus allowing the food products at the place to be sealed to be removed thereby permitting a perfect seal at this place.

Another object of the invention is to provide a machine for packaging food products in a bag having means for blowing a gas into a partially completed bag.

Another object of the invention is to provide a method of packaging food products in a bag which includes the blowing of air or other gas into a partially completed bag.

Another object of the invention is to provide a machine for continuously packaging potato chips having a generally vertically disposed tube member about which a continuous tube of packaging material is formed which material is intermittently pulled downward over the lower end of the tube member and sealed by a pair of sealing jaws to form a bag with an open top and chips are introduced into the upper end of the tube member and caused to fall by gravity into the bag and snapper jaws strike the open top bag where it is to be subsequently sealed to break up chips and cause them to fall further into the bag and means are provided to blow air or other gas down the tube member and the sealing jaws are caused to seal the open top of the bag and a cutting blade severs the completed bag from the continuous tube or packaging material.

Another object of the invention is to provide a machine for packaging potato chips having a tube about which a continuous tube of packaging material is formed and through which potato chips pass as they are introduced into bags formed of the packaging material, with a plunger of resilient material to pass through the tube and partially into the bags to insure passage of all chips through the tube and into the bags.

Another object of the invention is to provide a machine for packaging potato chips in bags having means for puffing out and straightening a bag which has been struck by a snapper jaw or breaking means and thereby distorted so that sealing jaws which subsequently seal the bag will do so at the exact place desired.

Another object of the invention is to provide a bag for containing food products which has a positive gas pressure therein.

Other objects and a fuller understanding of this invention may be had by referring to the following description and claims, taken in conjunction with the accompanying drawings, in which:

Figure 5 is a view taken generally along the line 5—5 of Figure 2;

Figure 6 is a fragmentary view taken generally along the line 6—6 of Figure 5;

Figures 7, 8, 9 and 10 show a modification of the packaging machine illustrated in Figures 1 through 6 and the various figures show the machine in different operating positions;

Figure 11 illustrates the operating cams for actuating the machine illustrated in Figures 7 through 10; and Figure 12 is an enlarged view of a package made and filled in accordance with the teachings of the present invention and containing a positive gas pressure.

Figure 1:
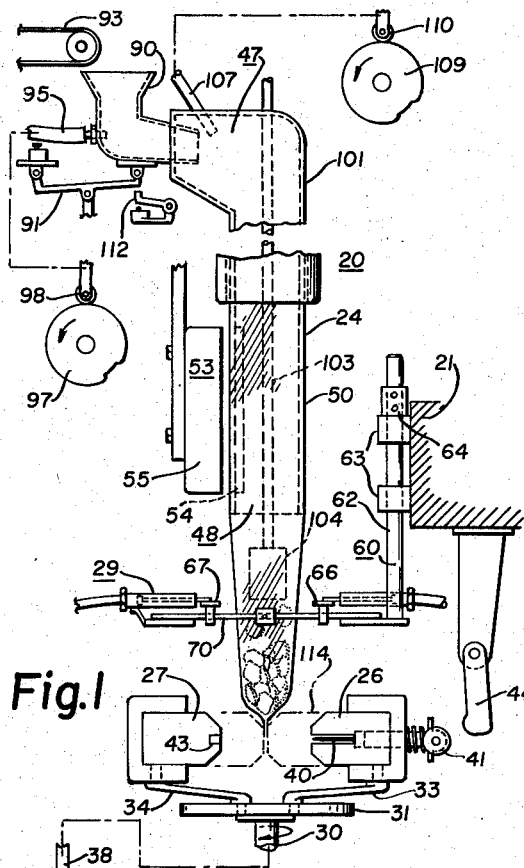
Figure 1 is a side elevational view of the automatic packaging machine of the present invention.

Briefly stated, the packaging machine 20 of the present invention includes a main frame 21 upon which is mounted a generally vertically disposed tube member 24, and a pair of heat sealing jaws 26 and 27 which are each operable through a generally rectilinear path to form and seal a continuous tube of packaging material, formed about the tube member, into individual packages. The packaging machine also includes a breaking mechanism 29 for breaking up food products which are clogged or trapped as the case might be in the continuous tube of packaging material at the point where the packaging material is to be sealed by the jaws 26 and 27.

The forthcoming detailed description of the packaging machine and the use to which it is put, will be described in conjunction with packaging potato chips, but it should be readily recognized by one skilled in the art that the machine is readily susceptible of use in packaging various food products, other than potato chips. Referring to Figure 1, the heat sealing jaws 26 and 27 are mounted by the main frame 21 although in the present drawings, they have not been shown mechanically connected to the main frame but have only been shown schematically. It is to be understood that any suitable means of mounting the sealing jaws on the main frame so that they are capable of movement through a generally rectilinear path through an operating cycle is contemplated by the present invention. Means are provided for moving the heat sealing jaws 26 and 27 through the above referred to rectilinear path and includes a shaft 30 adapted to drive a cam plate 31 to which first and second crank arms 33 and 34 are respectively connected. The shaft 30 is driven by any suitable source of power which driving movement is electrically controlled by the cam 37 and cam follower 38. With the cam and cam follower 37 and 38 as shown in Figure 1, the machine is in the stopped or intermittent drive position. The heat sealing jaw 26 carries a cutting blade 40 which is actuated by a cam follower 41 when in a predetermined position in the operating cycle of the machine, and which is adapted to move into a recess 43 in the heat sealing jaw 27. The cam follower 41 is actuated by an actuating lever 44 which is suitably secured to the main frame 21.

The cylindrical tube member 24 is coaxially mounted by the main frame 21 and has an upper and lower open end portion 47 and 48, respectively. The lower end of the cylindrical tube 24 resides adjacent the upper portion of the rectilinear path of the sealing jaws. Means (not shown) are provided for continuously feeding a sheet of packaging material 50 into wrapped around relationship with the cylindrical tube member 24 with opposite edges of the packaging material being overlapped. The packaging material is carried on the outer periphery of the tube member 24 and is initially formed into a cylindrical tube of packaging material by the tube member. Sealing means 53 which include a backing member 54 within the cylindrical tube member 24 and a heating shoe 55 outside of the cylindrical tube member cooperate to seal the overlapped edge portions of the packaging material. The packaging material is thus formed into a permanent continuous tube which extends downwardly over and off of the lower end 48 of the tube 24 and between the heat sealing jaws 26 and 27.

Figure 2:
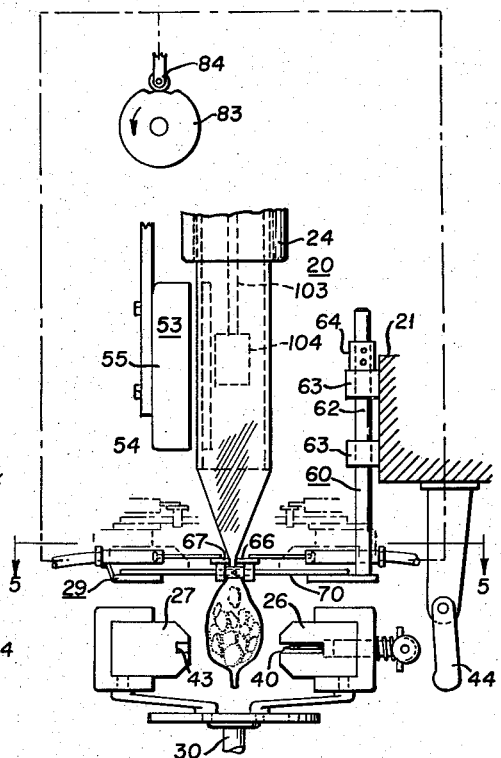
Figures 2, 3 and 4 are fragmentary views of the machine shown in Figure 1 in various operating positions during a complete cycle of making and packaging a bag of food products.
Figure 4:
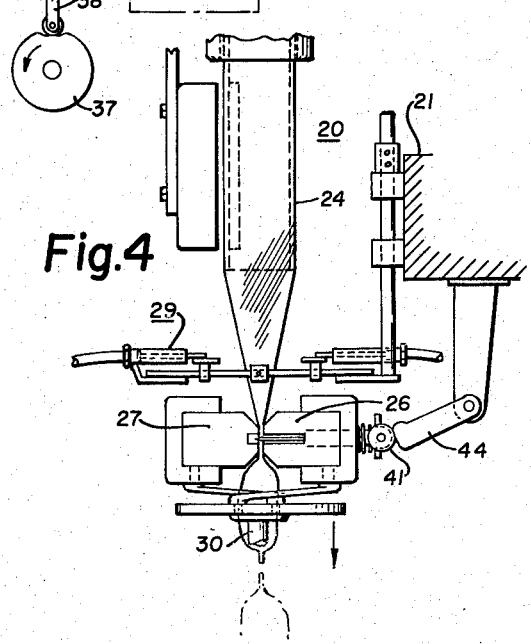

A snapper bar frame 60 or, in other words, a frame to support the breaking mechanism 29 (Figures 1, 5 and 6) is slidably supported by the main frame 21 in the path of the sealing jaws for vertical movement. The snapper bar frame 60 includes a post 62 which is slidable through brackets 63 secured to the main frame 21. The downward vertical movement of the post 62 is limited by a collar 64 which is secured to the upper end thereof. First and second oppositely disposed snapper bars or jaws 66 and 67 are slidably supported by first and second horizontally disposed guide posts 70 and 71. Means are provided for moving the snapper jaws 66 and 67 toward each other on the guide posts 70 and 71 and this means includes first and second air cylinders 73 and 74 in which pistons 75 and 76 are adapted to reciprocate. Conduits 78 and 79 are provided for supplying air to the cylinders 73 and 74, respectively, to move the snapper jaws 66 and 67 together as shown in Figure 6. The pistons 75 and 76 are connected to the jaws 66 and 67, respectively, by means of piston rods 80 and 81. In Figure 2, a cam 83 and associated follower 84 are adapted to control the flow of air into the air cylinders 73 and 74, respectively at a predetermined time during the operating cycle. Means are also provided for moving the snapper jaws away from each other or into the position shown in Figures 1, 3 and 4, rather than Figures 2, 5 and 6. This means includes springs 86 and 87 extending between the snapper bar frame 60 and piston rods 80 and 81, respectively.

A hopper 90 (Figure 1) is located at the upper end 47 of the cylindrical tube member 24 and is supported on a scale 91. A conveyer 93 is provided and is adapted to transport chips to the hopper 90. An air or gas nozzle 95 connected to any suitable source of air or gas supply (not shown), which supply is controlled by the action of the cam 97 and associated cam follower 98 and is adapted to blow the chips out of the hopper 90 and into the cylindrical tube member 24 by way of a hood 101. A plunger 103 having a lower end portion 104 formed of plastic material is mounted for vertical movement up and down the tube member 24. Means (not shown) are provided for moving the plunger 103 up and down the tube member and in the present embodiment the sealing jaws are mechanically connected to the plunger. It will, of course, be readily recognized that any means can be used to drive the plunger up and down the tube in synchronism with the rest of the packaging mechanism. In the present form of the invention when the sealing jaws have reached their uppermost vertical travel, the plunger has accordingly reached its upper most travel and when the sealing jaws have reached their lowermost vertical travel so has the plunger. A second air or gas nozzle 107 is connected to any suitable source of air or gas (not shown) and is controlled by the movement of a cam 109 and its associated cam follower 110. The air nozzle 107 is adapted to help guide chips which are blown from the hopper 90 down the tube member 24 and is also used to restraighten the bag which is being formed at the lower end of the tube by forcing air into the bag which returns it substantially to its normal shape after the snapper bars have struck the bag.

Figure 3:
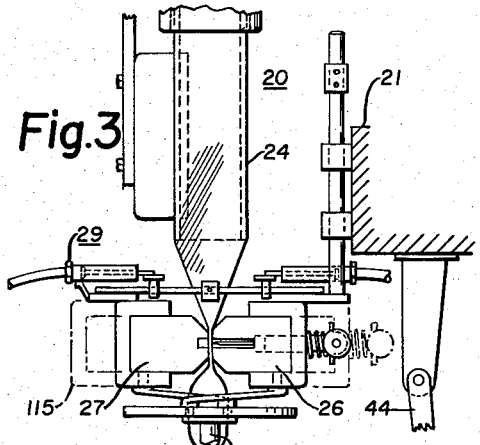

The following is a detailed description of an operating cycle of the machine shown in Figures 1 through 6. The starting position of the machine is that which is shown in Figure 1 of the drawings with the sealing jaws 26 and 27 being in the position shown in the full line drawings. This is the lowermost vertical position of the sealing jaws. The cam 37 and follower 38 having stopped the machine in the position shown at the end of the preceding cycle. When the conveyer 93 has transported a predetermined weight of potato chips into the hopper 90 the scale 91 tips and a switch 112 is closed. The closing of the switch 112 causes the drive mechanism to be actuated and the sealing jaws 26 and 27 start their upward vertical travel in the spaced apart positions shown in Figure 1. When the jaws have traveled vertically to the position shown in Figure 2 the cam 83 and associated follower 84 cause the snapper jaws to be actuated to the position shown in Figures 2, 5 and 6. This movement of these jaws together causes any potato chips which are located at this point to be broken up and when the jaws are moved away from each other by the action of the springs 86 and 87 these broken particles of potato chips fall on down into the bag. As the sealing jaws 26 and 27 continue their upward vertical movement to the position shown in Figure 3 they are caused to engage the underside of the snapper bar frame 60 which causes this frame 60 to move upwardly. When the sealing jaws reach the position shown in Figure 3 indicated by the dot-dash lines 115, their vertical travel ceases and the drive mechanism then causes the jaws to be brought transversely together to engage and seal the tube of packaging material at substantially the same place that it was struck by the snapper jaws. Just prior to the jaws reaching the full line position shown in Figure 3 the cams 97 and 109 and their respective followers 98 and 110 cause the chips for the next bag to be blown out of the hopper 90 and into the tube member and causes gas to be discharged through the nozzle 107 to guide the chips down the tube and also to cause air to puff out the bag and restraighten it after its having been struck by the snapper jaws which are shown in Figure 2. When the jaws reach the full line position shown in Figure 3, the drive mechanism then causes the closed sealing jaws 26 and 27 to move vertically downward in the full line position shown in Figure 3 and during this downward movement the actuating lever 44 engages the cam follower 41 and the cutting blade 40 severs the completed package of potato chips from the continuous tube of packaging material. By the same token while the sealing jaws are moving downwardly and the cutting blade is severing the completed bag of chips, the jaws are pulling the continuous tube of packaging material down over the end of the tube 24 to another bag length. At the same time the potato chips, which were blown out of the hopper and into the tube member 24 just prior to the sealing jaws coming together as shown in Figure 3, are falling into the next package which is being made on the downward travel of the sealing jaws. As the sealing jaws move downwardly so does the plunger 103 and as they reach their lowermost vertical position the end of the plunger 104 just moves into the top of the next package to be formed (Figure 1). This along with the action of the snapper jaws insures that no chips will remain in the upper open end of the package which is to be subsequently sealed and severed by the action of the sealing jaws and the cutter blade. Therefore no chips remain in the package seal.

Figure 7 through 10 illustrate a modification of the machine shown in Figures 1 through 6. However where the parts and construction are the same, the same reference numerals will be used throughout. One of the differences of the machine shown in Figures 7 through 10 is best seen in Figure 9. The plunger which was indicated by the reference numeral 103 in Figures 1 through 6 has been modified and the plunger illustrated in Figures 9 and 10 has been indicated by the reference numeral 118. This plunger is mounted for vertical movement up and down the tube member 24 and is controlled by the upward and downward movement of the sealing jaws 26 and 27. The plunger 118 has also been provided with an aperture or passageway 119 through which air or any other gas may travel. A supply of gas or air from any suitable source is connected to the aperture 119 and is controlled by the action of a cam 120 and associated cam follower 121. If desired a sealing member 127 may be connected to the plunger 118 for movement therewith to keep a higher pressure in the tube 24 and the bag. The air nozzle 107 which was illustrated in the previous machine (Figure 1) has been dispensed with in the machine illustrated in Figures 7 through 10. The operating cycle of the machine in Figures 7 through 10 has also been changed from that of the previously described machine. However the remaining structure and mechanism is substantially as hereinbefore described. The following is a detailed description of the operation of the machine as illustrated in Figures 7 through 10. In the starting position of the machine (Figure 7) the sealing jaws 26 and 27 are in the position shown in the dot-dash lines 123. When the hopper 90 has been loaded with a predetermined weight of chips, the switch 112 is thrown and the driven mechanism is actuated. The sealing jaws in the dot-dash lines 123 were at their uppermost vertical point of travel. The sealing jaws next come together into the full line position of Figure 7 and then travel downwardly together as shown in Figure 8. Between the full line position of Figure 7 and the position of Figure 8 the cam 97 causes chips to be blown out of the hopper and down the tube member 24. During the downward travel of the jaws the actuating lever 44 causes the cutting blade 40 to sever the finished bag of chips from the continuous tube of packaging material. The dot-dash lines 124 of Figure 9 show the lowermost, closed position of travel of the sealing jaws. As the jaws move laterally apart into the full line position of Figure 9, the cam 120 and associated follower 121 cause gas to be introduced down the tube member 24. This causes the bag which is being formed to be filled with gas and to be at all times puffed out. As the jaws start through their open, upward vertical travel, the snapper jaws are actuated as shown in Figure 10 and any chips which are at the place which is to be sealed by the jaws 26 and 27 are broken and at the same time the gas through the plunger 118 is kept on thus reforming the bag and is not turned off until immediately before the sealing jaws come together into the full line position of Figure 7. This completes the bag with a positive pressure of gas trapped therein. This timing of the mechanism produces a bag or package of potato chips which comprises a tube of packaging material which is hermitically sealed at either end portion and which contains a gas under a positive pressure. Figure 12 shows and illustrates the finished package of potato chips with the positive gas under pressure trapped therein. All of the cams used to actuate the machine shown in Figures 7 through 10 are shown in Figure 11. All of these cams are mounted on the same shaft 130 and rotate in unison through a complete packaging cycle. Their relative positions with respect to each other are also indicated in this Figure 11. Some of the advantages of a food product packaged in this type of a bag is that with the package puffed out in this condition at all times because of the gas under positive pressure, the bags can more easily be shipped in a container without fear of the chips being damaged because each of the packages are kept from engagement with each other. Another advantage is that many types of gases which are conducive to the preservation of food can be introduced into the package which will then result in a long shelf life of the packages withthe.

The method of packaging food products which is contemplated and which is carried out by the machine of the present invention comprises generally the steps of providing the generally vertical disposed tube member 24 and forming the continuous tube of packaging material 50 about the tube by wrapping a continuous sheet of packaging material thereabout and sealing the overlapped edges together. The sealing jaws 26 and 27 are moved closed in a direction generally transverse to the extent of the tube member to seal an end of the tube of packaging material which extends below the lower end portion of the tube member to form an open ended bag with a closed bottom. The closed sealing jaws are then moved away from the tube member to pull the tube of packaging material to a bag length and then opened while potato chips are introduced onto a scale. Chips are blown off of the scale into an upper end of the tube member whereupon they fall through the tube by the action of gravity into the open ended bag. The plunger (103, 118) is moved into the tube member and air is blown into the open bag to puff it open. Opposite sides of the tube of packaging material at substantially a bag length away from the sealed end of the tube of packaging material are struck and the open sealing jaws are moved toward the tube member to a place substantially even with a place where the tube of packaging material was struck and they are then moved closed in a direction generally transverse to the extent of the tube member to seal the tube of packaging material at substantially the same place where it was struck to close the open end of the bag. The closed jaws are again moved away from the tube member to pull the tube of packaging material to another bag length and the tube of packaging material at the place where sealed is cut to sever the filled bag from the tube of packaging material.

It will thus be seen that the machine and method of the present invention produces a package of food products and more specifically a package of potato chips which has a perfect seal. The use of the breaking means or snapper jaws as aided by the plunger results that none of the potato chips which travel down the cylindrical tube member have an opportunity to remain at the place where the sealing jaws close the bag. The provision of introducing a gas into the tube member which subsequently travels to the bag keeps the open ended bag at all times formed or reformed as the case may be so that it will be in aligned position for the sealing jaws to perform their function. The machine illustrated in Figures 7 through 10, by varying the size of the aperture 119 and the seal 127, is adapted to produce a packaged bag of potato chips which has a positive gas pressure having an upper limit in the range of, or in the neighborhood of four pounds per square inch therein for the advantages which have been hereinabove described. The machine of Figures 1 through 4 is adapted to produce a package of food products which has substantially no gas pressure or which has a gas pressure which is substantially less than four pounds per square inch. A big advantage of having the bags with the positive gas pressure is that when the bags are stacked one upon the other in a shipping carton, the piled up weight will be resisted by the gas pressure. As a result the chips, particularly the bottom ones, will not be crushed because of the piled up weight of the other bags of chips. The plastic end 104 of the plunger 103 is advantageous from the standpoint that if for some accidental reason the end of the plunger should fall between the sealing jaws the jaws will not become severely damaged as they would if the end of the plunger were metal. In Figure 12 the sealed end portions of the package 137 of potato chips 138 are indicated by the reference numerals 139 and 140, respectively.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. The method of packaging food products in bags comprising the steps of providing a hollow feed chute, forming around said hollow feed chute an open ended bag with a sealed bottom and an open top, introducing a food product through said hollow feed chute into said open ended bag through said open top, closing said open end of said bag temporarily at the place where the bag is to be sealed to cause food product thereat to be broken up, blowing air through said hollow feed chute into said open ended bag to reopen the same where temporarily closed, and sealing said open end of said bag at the place where temporarily closed.

2. The method of continuously packaging potato chips in bags comprising the steps of providing a hollow feed chute, forming around said chute a continuous tube of packaging material, sealing an end portion of said tube of packaging material to form an open ended bag with a sealed bottom, introducing potato chips into said open ended bag through said chute, striking opposite sides of said tube of packaging material substantially a bag length away from said sealed end portion to break up potato chips at this place, blowing air through said chute into the open end of said bag to aid in reopening said bag where struck whereby potato chips broken at this place may fall into said bag sealing said tube of packaging material at said place where struck to close said open end of said bag, and cutting said tube of packaging material at substantially the same place where sealed to sever said filled bag from said tube of packaging material.

3. The method of continuously packaging potato chips in bags comprising the steps of providing a hollow feed chute, forming around said chute a continuous tube of packaging material, sealing an end portion of said tube of packaging material to form an open ended bag with a sealed bottom, introducing potato chips into said open ended bag through said chute, breaking chips located substantially a bag length away from said sealed end portion and removing the means utilized to break the chips to allow any broken chips to fall into said bag away from the place where said bag is to be sealed, sealing said tube of packaging material at said place where said chips were broken to close said open end of said bag, and cutting said tube of packaging material at substantially the same place where sealed to sever said filled bag from said tube of packaging material.

4. A machine with a generally vertical axis for packaging potato chips comprising a main frame, a pair of oppositely disposed sealing jaws mounted by said main frame and adapted for movement through a rectilinear path, means for moving said sealing jaws through said rectilinear path, one of said jaws having a cutting blade, a coaxial tube member mounted by said main frame and having a lower end portion residing adjacent a portion of said rectilinear path, packaging material having overlapped edge portions carried on the outer periphery of said tube member and extending downwardly therefrom between said pair of sealing jaws, sealing means cooperating with said tube member for sealing said overlapped edge portions of said packaging material to form a continuous tube of packaging material, a snapper bar frame slidably supported by said main frame in the path of said sealing jaws for vertical movement, said snapper bar frame having a pair of oppositely disposed snapper bars movable toward and away from each other, means for moving said snapper bars toward each other and means for moving them away from each other, a hopper located at an upper end portion of said tube member and residing on a scale, conveyer means conveying chips to said hopper, air means for blowing said chips from said hopper and into said upper end portion of said tube member, a plunger adapted for vertical movement up and down said tube member, means synchronized with the movement of said sealing jaws for vertically moving said plunger, said plunger having an opening extending therethrough through which air may pass, means for introducing air through said opening in said plunger, and cam means for operating said cutting blade.

5. A machine with a generally vertical axis for packaging potato chips comprising a main frame, a pair of oppositely disposed sealing jaws mounted by said main frame and adapted for movement through a rectilinear path, means for moving said sealing jaws through said rectilinear path, one of said jaws having a cutting blade, a coaxial tube member mounted by said main frame and having a lower end portion residing adjacent a portion of said rectilinear path, packaging material having overlapped edge portions carried on the outer periphery of said tube member and extending downwardly therefrom between said pair of sealing jaws, sealing means cooperating with said tube member for sealing said overlapped edge portions of said packaging material to form a continuous tube of packaging material, a snapper bar frame slidably supported by said main frame in the path of said sealing jaws for vertical movement, said snapper bar frame having a pair of oppositely disposed snapper bars movable toward and away from each other, means for moving said snapper bars toward each other and means for moving them away from each other, a hopper located at an upper end portion of said tube member and residing on a scale, conveyer means conveying chips to said hopper, air means for blowing the chips from said hopper and into said upper end portion of said tube member, a plunger adapted for vertical movement up and down said tube member, said plunger having a lower end portion formed of plastic material, means synchronized with the movement of said sealing jaws for vertically moving said plunger, means for introducing air into said tube member, and cam means for operating said cutting blade.

6. A machine for packaging potato chips comprising a main frame, a pair of oppositely disposed sealing jaws mounted by said main frame and adapted for movement through a rectilinear path, means for moving said sealing jaws through said rectilinear path, said machine having a cutting blade, a tube member mounted by said main frame and having an end portion residing adjacent a portion of said rectilinear path, packaging material carried on the outer periphery of said tube member over said end portion and extending therefrom between said pair of sealing jaws, a snapper bar frame slidably supported by said main frame in the path of said sealing jaws, said snapper bar frame having a pair of oppositely disposed snapper bars movable toward and away from each other, means for moving said snapper bars toward each other and means for moving them away from each other, means for introducing chips into said tube member, a plunger adapted for vertical movement up and down said tube member, means synchronized with the movement of said sealing jaws for vertically moving said plunger, and means for operating said cutting blade.

7. A machine for packaging potato chips comprising a main frame, sealing jaw means mounted by said main frame and adapted for movement through a sealing path, means for moving said sealing jaw means through said sealing path, a tube member mounted by said main frame and having an end portion residing adjacent a portion of said sealing path, first and second oppositely disposed snapper bars supported by said frame and movable toward and away from each other, means for moving said snapper bars toward each other and means for moving them away from each other, means for introducing chips into said tube member, a plunger adapted for movement within said tube member, and means for moving said plunger.

8. A machine for packaging potato chips comprising a main frame, sealing jaw means mounted by said main frame and adapted for movement through a sealing path, means for moving said sealing jaw means through said sealing path, a tube member mounted by said main frame and having an end portion residing adjacent a portion of said sealing path, a snapper bar frame slidably supported by said main frame in the path of said sealing jaws, said snapper bar frame having first and second oppositely disposed snapper bars movable toward and away from each other, means for moving said snapper bars toward each other and means for moving them away from each other, means for introducing chips into said tube member, a plunger having a plastic end portion and adapted for movement within said tube member, and means for moving said plunger.

9. A machine for packaging potato chips comprising a main frame, sealing jaw means mounted by said main frame and adapted for movement through a sealing path, means for moving said sealing jaw means through said sealing path, a tube member mounted by said main frame and having an end portion residing adjacent a portion of said sealing path, a snapper bar frame slidably supported by said main frame in the path of said sealing jaw, said snapper bar frame having first and second oppositely disposed snapper bars movable toward and away from each other, means for moving said snapper bars toward each other and means for moving them away from each other, means for introducing chips into said tube member, a plunger having a plastic end portion adapted for movement within said tube member, means for moving said plunger, and means for introducing a gas into said tube member to create a slight gas pressure.

10. The method of packaging potato chips in bags comprising the steps of providing a generally vertically disposed tube member, forming a continuous tube of packaging material about said tube member, moving first and second sealing jaws closed in a direction generally transverse to the extent of said tube member to seal an end of said tube of packaging material which extends below the lower end portion of said tube member to form an open ended bag with a closed bottom, moving said closed sealing jaws away from said tube member to pull said tube of packaging material to a bag length, opening said sealing jaws, introducing potato chips into an upper end of said tube member whereupon said chips fall through said tube member into said open ended bag, moving a plunger down said tube member, striking opposite sides of said tube of packaging material substantially a bag length away from said sealed end of said tube of packaging material, moving said open sealing jaws toward said tube member to a place substantially even with said place where said tube of packaging material was struck, moving said first and second sealing jaws closed in a direction generally transverse to the extent of said tube member to seal said tube of packaging material at substantially said place where struck to close said open end of said bag, again moving said closed sealing jaws away from said tube member to pull said tube of packaging material to another bag length, and cutting said tube of packaging material at said place where sealed by said sealing jaws to sever said filled bag from said tube of packaging material.

11. The method of packaging potato chips in bags comprising the steps of providing a generally vertically disposed tube member, forming a continuous tube of packaging material about said tube member by wrapping a continuous sheet of said packaging material thereabout and sealing the overlapped edges together, moving first and second sealing jaws closed in a direction generally transverse to the extent of said tube member to seal an end of said tube of packaging material which extends below the lower end portion of said tube member to form an open ended bag with a closed bottom, moving said closed sealing jaws away from said tube member to pull said tube of packaging material to a bag length, opening said sealing jaws, introducing potato chips onto a scale, blowing said chips off said scale into an upper end of said tube member whereupon said chips fall through said tube member into said open ended bag, moving a plastic plunger down said tube member and into said open ended bag, blowing air into the upper end of said tube member, striking opposite sides of said tube of packaging material substantially a bag length away from said sealed end of said tube of packaging material, moving said open sealing jaws toward said tube member to a place substantially even with said place where said tube of packaging material was struck, moving said first and second sealing jaws closed in a direction generally transverse to the extent of said tube member to seal said tube of packaging material at substantially said place where struck to close said open end of said bag, again moving said closed sealing jaws away from said tube member to pull said tube of packaging material to another bag length, and cutting said tube of packaging material at said place where sealed by said sealing jaws to sever said filled bag from said tube of packaging material.

12. The method of packaging potato chips in bags comprising the steps of providing a generally vertically disposed tube member, forming a continuous tube of packaging material about said tube member by wrapping a continuous sheet of said packaging material thereabout and sealing the overlapped edges together, moving first and second sealing jaws closed in a direction generally transverse to the extent of said tube member to seal an end of said tube of packaging material which extends below the lower end portion of said tube member to form an open ended bag with a closed bottom, moving said closed sealing jaws away from said tube member to pull said tube of packaging material to a bag length, opening said sealing jaws, introducing potato chips onto a scale, blowing said chips off said scale into an upper end of said tube member whereupon said chips fall through said tube member into said open ended bag, moving a plunger down said tube member, blowing air through said plunger to puff up said open ended bag, striking opposite sides of said tube of packaging material substantially a bag length away from said sealed end of said tube of packaging material, moving said open sealing jaws toward said tube member to a place substantially even with said place where said tube of packaging material was struck, moving said first and second sealing jaws closed in a direction generally transverse to the extent of said tube member to seal said tube of packaging material at substantially said place where struck to close said open end of said bag, again moving said closed sealing jaws away from said tube member to pull said tube of packaging material to another bag length, and cutting said tube of packaging material at said place where sealed by said sealing jaws to sever said filled bag from said tube of packaging material.

13. A machine for packaging a food product in bags comprising a feed chute, means for forming around said feed chute an open ended bag with a sealed bottom and an open top, means for introducing a food product through said feed chute into said open ended bag through said open top, means for closing said open end of said bag temporarily at the place where the bag is to be sealed to cause said food product to be removed, means for blowing air into said open ended bag to reopen the same where temporarily closed, and means for sealing said open end of said bag at the place where temporarily closed.

14. A machine for continuously packaging food products in bags comprising a feed chute, means for forming around said feed chute a continuous tube of packaging material, means for sealing an end portion of said tube of packaging material to form an open ended bag with a sealed bottom, means for introducing food products into said open ended bag, means for contacting said bag on the outside thereof for breaking food products located within said bag at a sealing location where said bag is to be sealed substantially a bag length away from said sealed end portion, means for removing said contacting means from contact with the outside of said bag at said sealing location, means for sealing said tube of packaging material at substantially said sealing location to close said open end of said bag, and means for cutting said tube of packaging material at substantially the same place where sealed to sever said filled bag from said tube of packaging material.

15. A machine for continuously packaging food products in bags comprising a feed chute, means for forming around said feed chute a continuous tube of packaging material, means for sealing an end portion of said tube of packaging material to form an open ended bag with a sealed bottom, means for introducing food products into said open ended bag, means for contacting said bag on the outside thereof for breaking food products located within said bag at a sealing location where said bag is to be sealed substantially a bag length away from said sealed end portion, means for removing said contacting means from contact with the outside of said bag at said sealing location, plunger means in said feed chute and adapted for movement into said bag at least to said sealing location to aid in removing food products from said sealing location, means for sealing said tube of packaging material at substantially said sealing location to close said open end of said bag, said plunger means being synchronized with said means for contacting said bag and said means for sealing said tube of packaging material and means for cutting said tube of packaging material at substantially the same place where sealed to sever said filled bag from said tube of packaging material.

16. A machine for continuously packaging potato chips and the like in bags comprising a generally vertically disposed feed chute, means for forming around said generally vertically disposed feed chute a continuous tube of packaging material, means for sealing an end portion of said tube of packaging material to form an open ended bag with a sealed bottom, vertically disposed plunger means positioned in said generally vertically disposed feed chute and spaced from the walls thereof and movable upwardly and downwardly therein, means for introducing by gravity potato chips and the like through said generally vertically disposed feed chute into said open ended bag, means for moving said plunger means downwardly in said generally vertically disposed feed chute only to engage potato chips and the like which may be located within said bag at a sealing location where said bag is to be sealed substantially a bag length away from said sealed end portion to cause any potato chips and the like which may be located at said sealing location to be dislodged or broken and subsequently to be moved further into said open ended bag, means for moving said plunger means upwardly in said generally vertically disposed feed chute out of said open ended bag away from said sealing location for a subsequent sealing operation, sealing means synchronized with the movement of said plunger means for sealing said tube of packaging material at substantially said sealing location to close said open end of said bag after said means has moved said plunger means upwardly away from said sealing location, and means for cutting said tube of packaging material at substantially the same place where sealed to sever the filled bag from said tube of packaging material.

17. A machine for continuously packaging potato chips and the like in bags comprising a generally vertically disposed feed chute, means for forming around said generally vertically disposed feed chute a continuous tube of packaging material, means for sealing an end portion of said tube of packaging material to form an open ended bag with a sealed bottom, vertically disposed plunger means positioned in said generally vertically disposed feed chute and spaced from the walls thereof and movable upwardly and downwardly therein, means for introducing by gravity potato chips and the like through said generally vertically disposed feed chute into said open ended bag, means for moving said plunger means downwardly in said generally vertically disposed feed chute only to engage potato chips and the like which may be located within said bag at a sealing location where said bag is to be sealed substantially a bag length away from said sealed end portion to cause any potato chips and the like which may be located at said sealing location to be dislodged or broken and subsequently to be moved further into said open ended bag, means for moving said plunger means upwardly in said generally vertically disposed feed chute out of said open ended bag away from said sealing location for a subsequent sealing operation, sealing means synchronized with the movement of said plunger means for sealing said tube of packaging material at substantially said sealing location to close said open end of said bag after said means has moved said plunger means upwardly away from said sealing location, said plunger means having an elastic end portion which travels into said open ended bag to said sealing location, and means for cutting said tube of packaging material at substantially the same place where sealed to sever the filled bag from said tube of packaging material.

References Cited in the file of this patent

UNITED STATES PATENTS

| | | | |
|---|---|---|---|
| 1,353,210 | Bates | Sept. 21, | 1920 |
| 1,986,422 | Zwoyer | Jan. 1, | 1935 |
| 2,145,941 | Maxfield | Feb. 7, | 1939 |
| 2,257,433 | Stokes | Sept. 30, | 1941 |
| 2,449,139 | Posner | Sept. 14, | 1948 |
| 2,522,682 | Lewis | Sept. 19, | 1950 |
| 2,555,758 | Noble | June 5, | 1951 |
| 2,649,671 | Bartelt | Aug. 25, | 1953 |
| 2,713,543 | Peters | July 19, | 1955 |
| 2,751,732 | Woppman | June 26, | 1956 |
| 2,828,591 | Vanden Bossche | Apr. 1, | 1958 |
| 2,861,406 | Holsman et al. | Nov. 25, | 1958 |